United States Patent [19]

Hicks et al.

[11] 4,339,369

[45] Jul. 13, 1982

[54] CATIONIC EPOXIDE-AMINE REACTION PRODUCTS

[75] Inventors: Darrell D. Hicks, Jeffersontown; David A. Shimp, Prospect, both of Ky.

[73] Assignee: Celanese Corporation, New York, N.Y.

[21] Appl. No.: 256,747

[22] Filed: Apr. 23, 1981

[51] Int. Cl.$^3$ .............................................. C08L 63/02
[52] U.S. Cl. .................................... 523/414; 528/104; 528/111
[58] Field of Search ............... 260/29.2 EP; 528/104, 528/111

[56] References Cited

U.S. PATENT DOCUMENTS

| | | | |
|---|---|---|---|
| 3,321,548 | 5/1967 | Sattler | 260/829 |
| 3,962,165 | 6/1976 | Bosso et al. | 260/29.2 EP |
| 3,984,299 | 10/1976 | Jerabek | 204/181 |
| 4,101,486 | 7/1978 | Bosso et al. | 260/29.2 TN |
| 4,122,067 | 10/1978 | Anderson | 528/104 |
| 4,226,969 | 10/1980 | Watson et al. | 528/111 |

FOREIGN PATENT DOCUMENTS

| | | | |
|---|---|---|---|
| 884929 | 11/1971 | Canada | 400/45 |
| 873264 | 7/1961 | United Kingdom . | |

*Primary Examiner*—Maurice J. Welsh
*Attorney, Agent, or Firm*—Herbert P. Price; T. J. Morgan

[57] ABSTRACT

Tertiary amine terminated resinous compositions are prepared by reacting a molar excess of a polyepoxide compound with a dihydric phenol in a large excess of a monoamine which contains one tertiary amine group and one primary hydroxyl group. The resinous composition can be salted with an acid and can be dissolved or dispersed in water. The aqueous dispersions or solutions can be formulated into primer coatings for metal objects.

27 Claims, No Drawings

CATIONIC EPOXIDE-AMINE REACTION PRODUCTS

BACKGROUND OF THE INVENTION

The field of art to which this invention pertains is synthetic resins containing a hydrophilic group, said resins being soluble or dispersible in water when salted.

Industrial coating processes utilizing aqueous dispersions or solutions of organic resinous film forming compositions continue to grow in importance. Aqueous coating compositions are used in various applications, such as spray coating, flow coating, and electrodeposition coating processes. Particularly useful organic resinous film forming compositions are cationic compositions which, primarily, are used in primer paints for metals. Such cationic compositions which contain amine nitrogen groups have superior corrosion resistance when formulated into primer paints. Particularly useful examples of cationic sinous compositions are the reaction products of polyepoxide resins and amines.

British Pat. No. 873,264 and U.S. Pat. No. 3,321,548 describe adducts of epoxy resins and primary or secondary amines, said adducts being useful as coating compositions when dissolved in organic solvents and subsequently crosslinked with polyisocyanates. In the adduct formation reaction, the primary amine reacts with an epoxy group of the epoxy resin to form a secondary amine group which is attached to the epoxy resin molecule plus a pendant hydroxyl group. In the same manner, the secondary amine reacts to form a tertiary amine group and a hydroxyl group.

U.S. Pat. No. 3,984,299 is representative of a number of patents which describe aqueous coating compositions made from adducts of epoxy resins and primary or secondary amines, said adducts being salted with acids to render them water soluble or water dispersible. The reaction involved in adduct formation is the same as described in the preceding paragraph.

U.S. Pat. Nos. 3,962,165 and 4,101,486 are representative of a number of patents which describe the reaction of epoxy resins and tertiary amine-acid salts to form resins which contain quaternary ammonium groups. Such resins are soluble in water and are useful as coating compositions.

Canadian Pat. No. 884,929 describes ungelled epoxy-containing reaction products of epoxy resins and amines wherein the amine contains one or more secondary or tertiary amino groups and at least one hydroxyl group. It is pointed out in the patent that the nature of the reaction product is not known with certainty and that several reactions may be involved. One postulated reaction is the reaction of the hydroxyl group of the amine with an epoxy group. It is also suggested that the amine group may either react with or initiate interreaction between epoxy groups.

SUMMARY OF THE INVENTION

This invention pertains to cationic resinous compositions. In particular this invention relates to cationic resinous coating compositions which when salted with an acid are dispersible or soluble in water. In another aspect this invention pertains to the process for making such resinous compositions.

The soluble and fusible resinous compositions of this invention are made from a polyepoxide compound, a dihydric phenol and a monoamine. The polyepoxide compound is derived from an epihalohydrin and a dihydric phenol and has an epoxide equivalent weight of about 110 to about 250. The dihydric phenol which is reacted and from which the polyepoxide compound is derived contains 2 phenolic hydroxyl groups and no other groups reactive with epoxide groups. The monoamine contains one tertiary amine group and one primary hydroxyl group. The polyepoxide compound, the dihydric phenol and the monoamine are reacted in the mole ratios of $X+1$ moles of polyepoxide compound to $X$ moles of dihydric phenol in the presence of $Y$ moles of monoamine wherein $X$ has a value of 1 to 5 and $Y$ is at least 8. The reaction of the three components is conducted at a temperature of about 25° C. to about 150° C. for a time sufficient for all of the epoxide groups to react. When the reaction is completed, the excess unreacted monoamine is removed by distillation.

The reactions which take place in this invention are the addition reaction between the epoxide groups or the polyepoxide compound and the phenolic groups of the dihydric phenol plus the addition reaction of the epoxide groups of the polyepoxide compound and the primary hydroxyl group of the monoamine. These addition reactions which result in ether groups and hydroxyl groups are catalyzed by the tertiary amine groups. The compositions of this invention are polyhydroxy-polyethers containing terminal tertiary amine groups.

The compositions of this invention can be modified by esterifying part of the hydroxyl groups on the resin chain with monocarboxylic acids or by etherifying part of the hydroxyl groups with monoepoxides.

The compositions of this invention, when salted with acids, can be dissolved or dispersed in water. Such aqueous compositions can be formulated into coating compositions which are particularly useful as primers for metals.

DESCRIPTION OF THE INVENTION

The polyepoxide compounds useful in this invention are glycidyl polyethers of dihydric phenols which contain more than one up to two 1,2-epoxide groups per molecule. Such polyepoxide compounds are derived from dihydric phenols and epihalohydrins and have epoxide equivalent weights of from about 110 to about 250. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenyl propane (or Bisphenol A as it is commonly called), p,p'-dihydroxybenzophenone, p,p'-dihydroxydiphenyl, p,p'-dihydroxydiphenyl ethane, bis(2-hydroxynaphthyl) methane, 1,5-dihydroxynaphthalene and the like. Preferred polyepoxide compounds are the glycidyl polyethers of Bisphenol A having an epoxide equivalent weight of 170 to about 210.

The dihydric phenols used in this invention are those which contain two phenolic hydroxyl groups and no other groups which are reactive with epoxide groups under the conditions used in this invention. Such phenols are the same as those listed hereinbefore from which the polyepoxide compounds are derived.

The amines used in this invention are momoamines which contain one tertiary amine group and one primary hydroxyl group. Such amine can be represented by the formula:

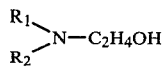

$$\begin{array}{c} R_1 \\ R_2 \end{array}\!\!\!\!\diagdown\!\! N\!\!-\!\!C_2H_4OH$$

wherein $R_1$ and $R_2$ are alkyl groups, the carbon atoms of which have a sum of 2 to 6. Another useful amine is N-hydroxyethyl morpholine. Examples of such amines are dimethylethanolamine, diethylethanolamine, diisopropylethanolamine, methylethylethanolamine, methylpropylethanolamine and the like. The preferred amine is diethylethanolamine.

In preparing the compositions of this invention, the reaction of the polyepoxide compound, the dihydric phenol and the monoamine is conducted in an excess of the monoamine. The mole ratio of polyepoxide compound to dihydric phenol in the reaction will vary from about 2:1 to about 6:5. The amount of monoamine which reacts with the polyepoxide compound and dihydric phenol is 2 moles. However, in conducting the reaction, at least an additional 6 moles of excess monoamine are present. The ratios of reactants can be expressed as X moles of dihydric phenol, X+1 moles of polyepoxide compound and Y moles of monoamine, wherein X has a value of 1 to 5 and Y has a value of at least 8. Preferably X has a value of 3 to 4 and Y has a value of 12 to 22. In the reaction involved in this invention, the monoamine serves as a solvent for the reaction, a catalyst for the reaction and as one of the reactants. There is no actual limit to the amount of amine which can be present in the reaction. However, for reasons of economy and practicality, the maximum amount of amine utilized will be about 25 moles, i.e., Y will vary from about 8 to no more than about 25.

In carrying out the process of this reaction, the three components can be blended together and reacted until the reaction is complete as evidenced by the absence of epoxide groups. Preferably, the dihydric phenol and amine are blended together and the polyepoxide compound is slowly added to the blend. The reaction can be conducted from room temperature (25° C.) up to the boiling point of the amines. Generally, the upper temperature of reaction will be about 150° C., and the preferred temperature range is about 60° C. to about 120° C. The time of reaction will vary from about 1 to about 6 hours depending upon the temperature of reaction, the particular reactants and the ratio of reactants.

When the reaction is completed, the excess unreacted monoamine is removed by distillation. The distillation can be conducted at atmospheric pressure or under vacuum. Vacuum is preferred at least in the final stages of the distillation to ensure removal of all of the unreacted amine. Steam distillation can also be used. Generally, the distillation is conducted under such conditions that the pot temperature does not exceed 225° C., and preferably 200° C.

In order to enhance the flexibility of the resinous compositions and to increase the electrical insulation capability when the compositions of this invention are used in electrodeposition processes, it is preferred to modify the resinous compositions by esterifying a portion of the hydroxyl groups of the resinous composition with monocarboxylic acids or by etherifying them with monoepoxides. Generally such modification will vary from 0 to about 25 weight percent based on total weight of resinous composition plus modifier and generally from about 5 to about 15 weight percent.

The monocarboxylic acids and monoepoxides which are used in this invention are those compounds which contain one carboxylic acid group or one 1,2-epoxide group per molecule and no other groups which are reactive with hydroxyl groups under the reaction conditions used in this invention. Monocarboxylic acids which can be used in this invention contain about 8 to about 24 carbon atoms and can be saturated or unsaturated. Examples of such acids are caprylic acid, capric acid, pelargonic acid, stearic acid, bihenic acid, oleic acid, linolenic acid and liconic acid. Such acids can be those derived from naturally occurring oils and which are named from the oil from which it is derived, e.g., linseed fatty acids, soya fatty acids, cottonseed fatty acids, cocoanut fatty acids and the like. The preferred monocarboxylic acids are those which contain from 8 to about 12 carbon atoms and which are saturated.

Examples of monoepoxides useful in this invention are epoxidized hydrocarbons, epoxidized unsaturated fatty esters, monoglycidyl ethers of aliphatic alcohols and monoglycidyl esters of monocarboxylic acids. Examples of such monoepoxides are epoxidized unsaturated hydrocarbons which contain 8 to 24 carbon atoms, e.g., octylene oxide, decylene oxide, dodecylene oxide and nonadecylene oxide; epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is hereby incorporated by reference. Examples of such glycidyl esters are those derived from about 9 to about 19 carbon atoms, particularly Versatic 911 Acid, a product of Shell Oil Company, which acid contains 9 to 11 carbon atoms. Preferred monoepoxides are those which contain about 8 to about 12 carbon atoms.

After the excess amine is removed from the reaction product of polyepoxide compound, dihydric phenol and monoamine, the reaction product can then be reacted with the monocarboxylic acid or monoepoxide. The monocarboxylic acid is reacted under esterifying conductions at a temperature of about 150° C. to about 250° C. with removal of water until the acid value is reduced below 5. The monoepoxide is reacted under etherifying conditions at a temperature of about 75° C. to about 230° C. for a time sufficient for all the epoxide groups to react, i.e., about 4 to about 8 hours.

The reaction of the polyepoxide compound, the dihydric phenol and the tertiary amine is preferably conducted in the absence of solvents. However, in view of the resinous nature of the products, it is sometimes preferred to conduct the reaction in an organic solvent. Any organic liquid which is a solvent for the reactants and reaction product and is nonreactive with epoxide groups and hydroxyl groups under the reaction conditions can be used. Such solvents include hydrocarbons, ethers, ketones, and the like. Preferred solvents are water soluble solvents, e.g., alkylene glycol diethers. The amount of solvent used can be any amount which is sufficient to render the reactants fluid at the reaction temperature. This amount of solvent will vary from about 0 to about 50 weight percent based on the total weight of the solution, and preferably 20 to 40 weight percent.

As stated hereinbefore, the resinous compositions of this invention are preferably made into aqueous coating compositions. In order to do this, it is necessary to add a neutralizing agent. Neutralization is accomplished by the salting of all or part of the amine groups by a water soluble organic or inorganic acid, e.g., formic acid, acetic acid, phosphoric acid, sulfuric acid, hydrochloric acid, and the like. A preferred acid is formic acid. The extent of neutralization depends upon the particular resin and it is only necessary that sufficient acid be added to solubilize or disperse the resin.

Aqueous coating compositions made from the resinous compositions of this invention can have a pH of about 3 to about 10, but preferably the pH will be about 5.0 to about 7.5 and, most preferably, about 6 to about 7. The amount of acid will vary from about 0.2 to about 1 equivalent for each amine nitrogen equivalent in the resin, but, preferably, about 0.25 to about 0.7 equivalent and, most preferably, about 0.3 to about 0.4 equivalent of formic acid. If the pH is too low, corrosion of equipment is a problem. Electrocoating baths with low pH's have high conductivity which causes the utilization of more current. More gassing occurs at the cathode causing rough coatings. The coatings have lower rupture voltage and the throwing power (the ability to coat protected areas) is decreased. If the pH is high, the resin generally is difficult to dissolve or disperse and the resulting solution or dispersion is unstable. A pH close to neutral is preferred in order to obtain the best balance of coating properties and bath stability.

The resinous composition of this invention, when made into a coating composition will be cured with a crosslinking agent. Such crosslinking agents are aminoplast resins, phenolplast resins and blocked polyisocyanates. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins. Aminoplast resins and their methods of preparation are described in detail in "Encyclopedia of Polymer Science and Technology", Volume 2, pages 1-91, Interscience Publishers (1965), which is hereby incorporated by reference.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make the phenolplast resins are phenol, o, m, or p-cresol, 2,4-xylenol, 3,4-xylenol, 2,5-xylenol, cardanol, p-tert-butylphenol, and the like. Aldehydes useful in this reaction are formaldehyde, acetaldehyde and propionaldehyde. Particularly useful phenolplast resins are polymethylol phenols wherein the phenolic group is etherified with an alkyl, e.g., methyl or ethyl, group. Phenolplast resins and their methods of preparation are described in detail in "Encyclopedia of Polymer Science and Technology", Volume 10, pages 1-68, Interscience Publishers (1969), which is hereby incorporated by reference.

The amount of aminoplast or phenolplast resin used with the resinous compositions of this invention is about 8 weight percent to about 30 weight percent of the total vehicle solids weight and, preferably, about 15 to about 20 weight percent.

Useful blocked polyisocyanates are those which are stable in the dispersion systems at ordinary room temperature and which react with the resinous product of this invention at elevated temperatures.

In the preparation of the blocked organic polyisocyanate, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane-4,4'4''-triisocyanate, 1,3,5-triisocyanate benzene and 2,4,6-triisocyanate toluene; and the tetraisocyanates such as 4,4'-diphenyl-dimethyl methane-2,2',5,5'-tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be a prepolymer derived from a polyol such as glycols, e.g., ethylene glycol and propylene glycol, as well as other polyols such as glycerol, trimethylolpropane, hexanetriol, pentaerythritol, and the like, as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol. Additional blocking agents include tertiary hydroxyl amines, such as diethylethanolamine and oximes, such as methylethyl ketoxime, acetone oxime and cyclohexanone oxime, and caprolactam.

The blocked polyisocyanate is formed by reacting a sufficient quantity of blocking agent with the organic polyisocyanate to insure that no free isocyanate groups are present.

The amount of blocked polyisocyanate used will vary from about 15 weight percent to about 40 weight percent based on the total vehicle solids weight and preferably about 20 weight percent to about 25 weight percent.

The aqueous coating compositions can also contain pigments, coupling solvents, anti-oxidants, surface-active agents and the like. The pigments are of the conventional type and are one or more of such pigments as iron oxides, lead oxides, strontium chromate, carbon black, titanium dioxide, talc, barium sulfate, barium yellow, cadmium red, chromic green, lead silicate and the like. The amount of pigment used will vary from no pigment up to a pigment/binder ratio by weight of 2:1 and preferably a pigment/binder ratio of about 1:1 to 1:4.

Coupling solvents are water soluble or partially water soluble organic solvents for the resinous vehicles used in this invention. Examples of such solvents are ethylene glycol monomethyl ether, ethylene glycol monoethyl ether, ethylene glycol monobutyl ether, diethylene glycol monobutyl ether, ethanol, isopropanol, n-butanol, and the like. These coupling solvents are used in the amounts of 0 up to about 5 weight percent of the total weight of the coating bath. The total batch solids are kept within the range, based on the total bath weight, of about 5 to about 20 weight percent and, preferably, about 12 to about 18 weight percent.

In utilizing the resin of this invention in electrodeposition processes, the electrocoating bath is prepared in an insulated container with an anode submersed in the bath and the object to be coated as the cathode. A direct electric current is applied using a voltage of 200 to 300 volts for a time sufficient to obtain a coating of about 0.5 to 1 mil, i.e., about 1 to 5 minutes. The coated object is then removed from the bath, rinsed and baked at 150° to 250° C. for 10 to 30 minutes to obtain a cured coating.

When used as dip coating primers, the resinous composition, curing agents, pigments, acid and water are formulated to a solids content of about 25 percent to about 35 weight percent in a dip tank. Metal objects are passed through the tank, are allowed to drip to remove excess paint and are baked at about 150° C. for about 10 to about 30 minutes.

The following examples will describe the invention in more detail. Parts and percentages are parts and percentages by weight unless otherwise designated.

EXAMPLE 1

To a suitable reactor were added 576 parts of the diglycidyl ether of Bisphenol A having an epoxide equivalent weight of 192. Heat, stirring and a nitrogen flush were applied. When the temperature reached 90° C., 513 parts of Bisphenol A were added, followed by the addition of 1.4 parts of triphenyl phosphine. The temperature rose to 175° C. in 16 minutes and was held at 160°–175° C. for 2.5 hours. Diethylethanolamine, 1665 parts, was then added and the temperature dropped to 80° C. Additional diglycidyl ether, 576 parts, was then added over a period of 36 minutes with the temperature at 76°–80° C. The temperature was held at 84°–89° C. for one hour and 16 minutes. The reactor was fitted for distillation and at 162° C. distillation began. Distillation was continued at atmospheric pressure for 4 hours with the temperature rising to 210° C. Vacuum was gradually applied over a one hour period down to a pressure of 1.6 mm Hg with the temperature at 214° C. When the distillation was completed, 450 parts of pelargonic acid were added and the reactor was fitted with a Barret trap. Xylene was added to the trap with a small amount added to the reactor to establish reflux. Heat was applied and at 182° C., water began to distill over. Heating with distillation and removal of water was continued for 6 hours and 30 minutes with the temperature rising to 231° C. At this point the acid value was 5.5 on solids basis. The monomethyl ether of ethylene glycol, 800 parts, was then added. The product solution had a solids content of 68.1% (20 minutes at 200° C. on a cure plate) and a Gardner-Holdt viscosity of V-W at 25° C. and at 40% solids in the monomethyl ether of ethylene glycol.

The product solution, 21 parts, was blended with 12.9 parts of a 70% solution, in a mixture of 41.3% methyl isobutyl ketone and 58.7% 2-ethylhexanol, of a blocked polyisocyanate made from 37.8% polymethylene polyphenylisocyanate having an average functionality of 2.7, 6.3% 2,2,4-trimethyl pentanediol and 25.9% caprolactam. The monohexyl ether of ethylene glycol, 6 parts, was added followed by 0.47 part of formic acid (89% in water). This amount of acid is 30 meq/100 gms of resin solids. Deionized water, 257 parts, was slowly added with agitation, forming a very good colloidal dispersion. The dispersion was placed in an electrocoating tank and phosphated steel panels were made the cathode in a direct current circuit. Panels were coated at 100 volts, 200 volts, 250 volts and 300 volts for 2 minutes. The coated panels were then rinsed and baked at 180° C. for 20 minutes. The coatings were well cured, exhibited good color, flow and were smooth with little or no cratering. The coatings were unaffected by 100 double rubs with methyl ethyl ketone. The coating thickness was found to be 0.1 mil for the 100 volt electrodeposition, 0.2 mil for 200 volts, 0.25 mil for 250 volts and 0.35–0.4 mil for 300 volts.

EXAMPLE 2

To a suitable reactor were added 569 parts of Bisphenol A and 1167 parts of diethylethanolamine. Heat was applied, stirring was begun and a stream of nitrogen was introduced into the reactor. When the temperature of the reactants reached 78° C., the slow addition of 1264 parts of the diglycidyl ether of Bisphenol A having an epoxide equivalent weight of 190 was begun. After 3 minutes, heating was stopped. The temperature slowly rose during the addition to 110° C. The addition was completed in 52 minutes. When the addition was completed, heat was reapplied raising the temperature to 128° C. in 42 minutes and to 145° C. in 2 hours and 7 minutes. The reactor was then fitted with a condenser to distill off the excess amine. When the reactor temperature reached 169° C., distillate began coming off. Heating and distillation were continued at atmospheric pressure to a reactor temperature of 200° C. Vacuum (water aspirator—31 mm Hg) was then applied for 30 minutes to complete the distillation.

The resulting epoxy-amine product yield was 1981 parts, the distillate—1007 parts. The product had a solids content of 99.0% (cure plate—200° C. for 20 minutes), % titratable nitrogen of 0.93 and a Gardner-Holdt viscosity of Y-Z at 40% solids in diethylene glycol monobutyl ether.

To a suitable reactor were added 1700 parts of the epoxyamine product and 300 parts of the glycidyl ether of mixed fatty alcohols containing predominantly n-dodecyl and n-tetradecyl groups and having an epoxide equivalent weight of 295. Heat and a nitrogen blanket were applied and stirring was begun when the mixture became molten. Heating was continued for 2 hours with the temperature slowly rising to about 230° C. The temperature was held at about 230° C. for about 5 hours. The monoethyl ether of ethylene glycol, 840 parts, was then slowly added. The resulting solution had a solids content of 69.3% (200° C. for 20 minutes) and a viscosity of 112,000 cps at 25° C. The % titratable nitrogen on solids basis was 0.81.

Using the same procedure as described above, 1268 parts of Bisphenol A and 4227 parts of the diglycidyl ether of Bisphenol A were reacted in 6505 parts of diethylethanolamine. After removal of the unreacted excess amine, 2025 parts of the cationic resin were reacted with 225 parts of pelargonic acid followed by dissolution in 720 parts of the methyl ether of ethylene glycol. A pigment paste was prepared by mixing 828.8 parts of this resin solution with 76.3 parts of 85% pure lactic acid, 324 parts of aluminum silicate, 96 parts of carbon black, 660 parts of lead monosilicate, 120 parts of barium chromate and 120 parts of 2,2,4-trimethyl-1,3-pentanediol monoisobutyrate followed by the addition of 775 parts of deionized water. The mixture was ground in a sand grinder for 2 hours.

To 228.6 parts of the resin solution described in the first 3 paragraphs of this example were added 128.6 parts of the blocked polyisocyanate solution described in Example 1 and 5.2 parts of formic acid (89% in H$_2$O). To the salted resin mixture were added 238.1 parts of the pigment paste described in paragraph 4 of this example followed by the addition of 1399.5 parts of deionized water, 20 parts of 2,2,4-trimethyl-1,3-pentanediol monoisobutyrate and 20 parts of the monohexyl ether of diethylene glycol. The resulting dispersion was placed in an electrocoating tank and steel panels, phosphated steel, galvanized steel and cold rolled steel, were electrocoated at 200 volts for 2 minutes. The coated steel panels were then removed from the tank, were rinsed with deionized water and were baked at 180° C. for 20 minutes. The coatings had a thickness of 0.6–0.7 mil and were very well cured. The panels were edge taped and X-scribed and were placed in a standard salt spray cabinet. After two weeks exposure, the panels were removed from the cabinet, rinsed, and patted dry. The scribed area was then covered with a high tack tape (Scotch Brand 710 Acetate Fiber Tape—3M Company). The tape was then pulled and the panels were examined for adhesion failure. The panels were rated as follows (0 being complete failure and 5 being no effect):

| | |
|---|---|
| Phosphated Steel | 4½ |
| Galvanized Steel | 2½–3 |
| Cold Rolled Steel | 3½–4 |
| The creepage at the scribe was: | |
| Phosphated Steel | <1.0 mm |
| Galvanized Steel | 2–½ mm |
| Cold Rolled Steel | 1–3 mm |
| Field blistering was: | |
| Phosphated Steel | None |
| Galvanized Steel | Light |
| Cold Rolled Steel | Light |

EXAMPLE 3

Using the same procedure described in Example 2, 4700 parts of the diglycidyl ether of Bisphenol A having an epoxide equivalent weight of 190, 2096 parts of Bisphenol A and 8204 parts of diethylethanolamine were reacted. After removal of the excess amine, the product had a solids content of 98.34 (cure plate 200° C. for 30 minutes), a Gardner-Holdt viscosity of X-Y at 25° C. at 40% solids in diethylene glycol monobutyl ether, and a % titratable nitrogen of 1.02.

Continuing to follow the procedure described in Example 2, 2340 parts of the above described product were reacted with 260 parts of the monoglycidyl ether described in Example 2. At the completion of the reaction, the product was dissolved in 1114 parts of ethylene glycol monomethyl ether. The solution had a solids content of 67.4% (20 minutes at 200° C.) and a viscosity at 25° C. of 77,400 cps. The % titratable nitrogen at 100% solids was 0.89.

A pigment paste was prepared by mixing 201.7 parts of the cationic resin solution described in paragraph 4 of Example 2 with 18.7 parts of 85% pure lactic acid, 79.2 parts of aluminum silicate, 23.4 parts of carbon black, 161.4 parts of lead monosilicate, 29.4 parts of barium chromate and 29.4 parts of 2,2,4-trimethyl-1,3-pentanediol monoisobutyrate followed by the addition of 543.2 parts of deionized water. The mixture was ground in a sand grinder for 2 hours.

To 229 parts of the resin solution described in the first 2 paragraphs of this example were added 128.6 parts of the blocked polyisocyanate solution described in Example 1 and 5.2 parts of formic acid (89% in water). To the salted resin mixture were added 250 parts of the pigment paste described in the third paragraph of this example followed by 1388 parts of deionized water. The resulting dispersion was placed in an electrocoating tank. The monohexyl ether of diethylene glycol, 25 parts, and 2,2,4-trimethyl-1,3-pentanediol monoisobutyrate, 35 parts, were added to the tank. Steel panels were then coated and baked using the procedure described in Example 2. The coatings, 0.6–0.7 mil thickness, were well cured with good mar resistance.

The coated steel panels were then placed in a salt spray cabinet and after 2 weeks exposure, the coatings were evaluated following the procedure of Example 2:

| Steel Panels | Tape Adhesion Test | Creepage at the Scribe | Field Blistering |
|---|---|---|---|
| Phosphated | 4½ | <1.0 mm | Very, Very Light |
| Galvanized | 3 | 0.5–1.0 mm | Medium |
| Cold Rolled | 3 | 1–3 mm | Medium |

EXAMPLE 4

Using the same procedure described in Example 2, 316 parts of Bisphenol A, 1053 parts of the diglycidyl ether of Bisphenol A (epoxide equivalent weight of 190) and 1620 parts of diethylethanolamine were reacted. After removal of the unreacted amine, the product, 1543 parts, had a % titratable nitrogen of 1.46 and a solids content of 99.3% (20 minutes at 200° C.).

The resulting cationic resin, 420 parts, was further reacted with 74 parts of a monoglycidyl ether of mixed fatty alcohols containing predominantly n-octyl and n-decyl groups, said glycidyl ether having an epoxide equivalent weight of 238, using the procedure described in Example 2. After dilution with 200 parts of ethylene glycol monomethyl ether, the product had a solids content of 66.1% (20 minutes at 200° C.) and a % titratable nitrogen of 1.31 on 100% solids basis.

The product solution, 30 parts, was blended with 12.8 parts of a 70 wt. % solution, in a mixture 41.3% methyl isobutyl ketone and 58.7% 2-ethylhexanol, of a blocked polyisocyanate made from 37.8% polymethylene polyphenylisocyanate having an average functionality of 2.7, 6.3% 2,2,4-trimethyl pentanediol and 25.9% caprolactam. The blend was heated until clear—40° C. A 20% aqueous solution of acetic acid, 2.25 parts (25 meq/100 gms total solids), was added followed by dilution with 255 parts of deionized water under high speed high shear mixing. A poor, coarse dispersion resulted.

The blend of amine adduct solution and blocked polyisocyanate was repeated using 3.6 parts of aqueous acetic acid (40 meq/100 gms total solids). A very good dispersion with excellent resistance to settling resulted. The pH of the dispersion was 5.9. The dispersion was placed in an electrodepostion tank. Steel panels were made the cathode in a direct current electric circuit and were immersed in the dispersion. The panels were coated 1 minute at 200° C. The coated panels were removed from the bath, rinsed and baked at 180° C. for 20 minutes. Good cured films were obtained.

EXAMPLE 5

Using the same procedure described in Example 2, 316 parts of Bisphenol A, 1053 parts of the diglycidyl ether of Bisphenol A (epoxide equivalent weight of 190) and 1620 parts of diethylethanolamine were reacted. After removal of the excess amine, the resulting product (1548 parts) had a solids content of 99.7% (200° C. for 20 minutes) and a % titratable nitrogen of 1.49.

The cationic resin product, 425 parts, was further reacted with 75 parts of the monoglycidyl ester of Versatic 911 Acid (Shell Oil Company) having an epoxide equivalent weight of 261. After being dissolved in 213 parts of ethylene glycol monomethyl ether, the resulting product had a solids of 64% (200° C. for 20 minutes) and a % titratable nitrogen of 1.38 based on 100% solids.

EXAMPLE 6

To a suitable reactor were added 569 parts of Bisphenol A and 1167 parts of diethylethanolamine. Heat, stirring and a nitrogen flush were applied and when the temperature reached 78° C., slow addition of 1264 parts of the diglycidyl ether of Bisphenol A (epoxide equivalent weight of 190) was begun. The addition was completed in one hour and 2 minutes with the temperature rising to 112° C. The temperature was then raised to 140° C. over a one hour and 26 minute period. At this point, the condenser was arranged for distillation of the unreacted excess amine. At 169° C., distillation began and after 46 minutes with the temperature at 184° C., vacuum was gradually applied. After 38 minutes, the temperature was 199° C. and the vacuum was 12 mm Hg pressure. Distillation was complete after an additional 37 minutes heating at 197°–201° C. with the vacuum being reduced to 1.4 mm Hg pressure.

Vacuum was released and the temperature was reduced to 170° C. Pelargonic acid, 219.7 parts, was added followed by 200 parts of xylene. The reactor was equipped for azeotropic distillation of water and xylene with return of xylene to the reactor. Heat was applied and distillation with removal of water began at 173° C. The temperature gradually rose to 231° C. over a period of about 11.5 hours with removal of 26.8 parts of water. The product was then reduced with 703 parts of ethylene glycol monomethyl ether. The resulting solution had a solids content of 71.6% (20 minutes at 200° C.), a viscosity of 251,200 cps at 25° C., an acid value, on 100% solids basis, of 0.97, and a % titratable nitrogen of 0.88 on solids basis.

EXAMPLE 7

Using the same procedure described in Example 6, 370 parts of Bisphenol A, 1233 parts of the diglycidyl ether of Bisphenol A having an epoxide equivalent weight of 190 and 1897 parts of diethylethanolamine were reacted. After removal of the excess amine, the cationic resin was esterified with 201.2 parts of pelargonic acid. The resulting product at 71.3% solids in xylene and ethylene glycol monomethyl ether had a viscosity of 116,600 cps at 25° C., a % titratable nitrogen of 1.41 on 100% solids basis and an acid value of 2.25 on 100% solids basis.

EXAMPLE 8

To a suitable reactor were added 576 parts of the diglycidyl ether of Bisphenol A having an epoxide equivalent weight of 192. Heat, stirring and a nitrogen flush were applied. At 60° C., 513 parts of Bisphenol A were added followed by 1.4 parts of triphenyl phosphine. The temperature of the reactants rose to 162° C. in 13 minutes. The temperature was held between 158°–172° C. for 2.5 hours. At the end of this heating period, 1665 parts of dimethylethanolamine were added with the temperature dropping to 80° C. Slow addition of an additional 576 parts of the diglycidyl ether was begun. Addition was completed in 52 minutes with the temperature holding at 80° C. The temperature was held at 80°–84° C. for one hour. The excess amine was then removed by distillation, first under atmospheric pressure followed by vacuum distillation to an absolute pressure of 2.7 mm Hg and a maximum pot temperature of 192° C. When the distillation was complete, 450 parts of pelargonic acid were added and the reactor was equipped with a Barret trap for azeotropic distillation of water. The temperature was raised to 172° C. at which point xylene was added to the trap along with a small amount to the reactor for refluxing. Water, 49 parts, was removed over a six hour period with the temperature rising to 227° C. After dilution with 800 parts of ethylene glycol monomethyl ether, the product had a solids content of 68.3% at 200° C. for 20 minutes, A Gardner-Holdt viscosity of $Z_6$-$Z_7$ at 25° C., an acid value on 100% solids basis of 5.5 and % titratable nitrogen at 100% solids of 0.98.

EXAMPLE 9

Using the same procedure described in Example 8, 1152 parts of the diglycidyl ether of Bisphenol A, 513 parts of Bisphenol A and 1665 parts of dimethylethanolamine were reacted. After removal of the unreacted amine, the cationic resin was esterified with 450 parts of tall oil fatty acids. The resulting product after being dissolved in 800 parts of ethylene glycol monomethyl ether had a solids content of 68.3% (20 minutes at 200° C.), a Gardner-Holdt viscosity at 25° C. of $Z_7+$, a % titratable nitrogen at 100% solids of 0.82, and an acid value at 100% solids of 1.1.

Electrodeposition baths were prepared using the resins described in Examples 5–9 using the procedures described in the first four examples. When electrodeposited on steel panels, coatings comparable to those of Examples 1–4 were obtained.

The principles, preferred embodiments and modes of operation of the present invention have been described in the foregoing specification. The invention which is intended to be protected herein, however, is not be be construed as limited to the particular forms disclosed, since these are to be regarded as illustrative rather than restrictive. Variations and changes may be made by those skilled in the art without departing from the spirit of the invention.

What is claimed is:

1. A process for preparing a resinous composition which comprises:
   (A) reacting
      (a) a polyepoxide compound derived from a dihydric phenol and an epihalohydrin, said polyepoxide compound having a 1,2-epoxide equivalent weight of about 110 to about 250;
      (b) a dihydric phenol; and
      (c) a monoamine which contains one tertiary amine group and one primary hydroxyl group at a temperature of about 25° C. to about 150° C. for a time sufficient to react all of the epoxide groups of the polyepoxide, wherein (a), (b) and (c) are reacted in the mole ratios of X moles of (b) to X+1 moles of (a) to Y moles of (c) wherein X has a value of 1 to 5 and Y is at least 8; and
   (B) removing the excess monoamine by distillation.

2. The process of claim 1 wherein the polyepoxide compound is a glycidyl polyether of Bisphenol A having an epoxide equivalent weight of about 170 to about 210, and the dihydric phenol is Bisphenol A.

3. The process of claim 1 wherein the monoamine has the formula:

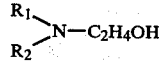

wherein $R_1$ and $R_2$ are alkyl groups having a combined total of 6 carbon atoms.

4. The process of claim 3 wherein the monoamine is diethylethanolamine.

5. The process of claim 1 wherein the monoamine is hydroxyethyl morpholine.

6. The process of claim 1 wherein the reaction temperature is about 60° C. to about 120° C.

7. The process of claim 1 wherein X has a value of 2 to 3 and Y has a value of 12 to 22.

8. The process of claim 1 wherein, after removing the excess monoamine, the resinous composition is esterified with a monocarboxylic acid having 8 to 24 carbon atoms at a temperature of about 150° C. to about 250° C. wherein the amount of monocarboxylic acid is about 0 to about 25 weight percent based on total weight of resinous composition and monocarboxylic acid.

9. The process of claim 8 wherein the acid contains 8 to 12 carbon atoms and is present in the amount of about 5 to about 15 weight percent.

10. The process of claim 1 wherein, after removing the excess monoamine, the resinous composition is etherified with a monoepoxide having 8 to 24 carbon atoms at a temperature of about 75° C. to about 230° C. wherein the amount of monoepoxide is about 0 to about 25 weight percent based on total weight of resinous composition and monoepoxide.

11. The process of claim 10 wherein the monoepoxide contains from 8 to 12 carbon atoms and is present in the amount of about 5 to about 15 weight percent.

12. A resinous composition comprising the reaction product of:
   (A) a polyepoxide compound derived from a dihydric phenol and an epihalohydrin, said polyepoxide compound having a 1,2-epoxide equivalent weight of about 110 to about 250;
   (B) a dihydric phenol; and
   (C) a moonoamine which contains one tertiary amine group and one primary hydroxyl group,
wherein (A), (B) and (C) are in the mole ratios of X moles of (B) to X+1 moles of (A) to Y moles of (C) wherein X has a value of 1 to 5 and Y is at least 8.

13. The composition of claim 12 wherein the polyepoxide compound is a glycidyl polyether of Bisphenol A having an epoxide equivalent weight of about 170 to about 210, and the dihydric phenol is Bisphenol A.

14. The composition of claim 12 wherein the monoamine has the formula:

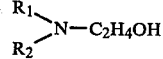

wherein $R_1$ and $R_2$ are alkyl groups having a combined total of 6 carbon atoms.

15. The composition of claim 14 wherein the monoamine is diethylethanolamine.

16. The composition of claim 12 wherein the monoamine is hydroxyethylmorpholine.

17. The composition of claim 12 wherein X has a value of 2 to 3 and Y has a value of 12 to 22.

18. The composition of claim 12 which, after removal of the excess monoamine, is esterified with a monocarboxylic acid having 8 to 24 carbon atoms in the amount of about 0 to about 25 weight percent based on total weight of resinous composition and monocarboxylic acid.

19. The composition of claim 18 wherein the acid contains 8 to 12 carbon atoms and is reacted in the amount of about 5 to about 15 weight percent.

20. The composition of claim 12 which, after removal of the excess monoamine, is etherified with a monoepoxide having 8 to 24 carbon atoms in the amount of about 0 to about 25 weight percent based on total weight of resinous composition and monocarboxylic acid.

21. The composition of claim 20 wherein the monoepoxide contains from 8 to 12 carbon atoms and is reacted in the amount of about 5 to about 15 weight percent.

22. An aqueous composition comprising the composition of claim 18 salted with an acid and dissolved or dispersed in water.

23. The aqueous composition of claim 22 plus a crosslinking agent.

24. The aqueous composition of claim 23 wherein the crosslinking agent is an aminoplast resin, a phenolplast resin, or a blocked polyisocyanate.

25. An aqueous composition comprising the composition of claim 20 salted with an acid and dissolved or dispersed in water.

26. The aqueous composition of claim 25 plus a crosslinking agent.

27. The aqueous composition of claim 26 wherein the crosslinking agent is an aminoplast resin, a phenolplast resin, or a blocked polyisocyanate.

* * * * *